United States Patent
Kschischo et al.

(10) Patent No.: US 6,363,717 B1
(45) Date of Patent: Apr. 2, 2002

(54) EXHAUST GAS DUCT COOLED WITH WATER

(75) Inventors: Albrecht Kschischo, Mannheim; Manfred Rapp, Ubstadt-Weiher, both of (DE)

(73) Assignee: Deutz AG, Cologne (DE)

( * ) Notice: Subject to any disclaimer, the term of this patent is extended or adjusted under 35 U.S.C. 154(b) by 0 days.

(21) Appl. No.: 09/646,019
(22) PCT Filed: Mar. 10, 1999
(86) PCT No.: PCT/EP99/01528
  § 371 Date: Nov. 20, 2000
  § 102(e) Date: Nov. 20, 2000
(87) PCT Pub. No.: WO99/46489
  PCT Pub. Date: Sep. 16, 1999

(30) Foreign Application Priority Data

Mar. 12, 1998 (DE) .......................... 198 10 726

(51) Int. Cl.⁷ .................................. F01N 3/02
(52) U.S. Cl. ............................. 60/320; 60/321
(58) Field of Search .................... 60/320, 321

(56) References Cited

U.S. PATENT DOCUMENTS

| | | | | |
|---|---|---|---|---|
| 3,946,697 A | * | 3/1976 | Hackbarth et al. | 60/320 |
| 3,948,052 A | * | 4/1976 | Merkle et al. | 60/321 |
| 4,179,884 A | * | 12/1979 | Koeslin | 60/321 |
| 4,205,527 A | * | 6/1980 | Rudert et al. | 60/321 |
| 4,463,709 A | * | 8/1984 | Pluequet | 60/321 |
| 4,483,140 A | * | 11/1984 | Pluequet | 60/321 |
| 4,866,934 A | * | 9/1989 | Lindstedt | 60/320 |
| 5,311,738 A | * | 5/1994 | Huster et al. | 60/321 |
| 5,337,559 A | * | 8/1994 | Deutschmann | 60/321 |
| 5,463,867 A | * | 11/1995 | Ruetz | 60/321 |
| 5,600,950 A | * | 2/1997 | Ottenschlaeger | 60/321 |
| 5,950,425 A | * | 9/1999 | Takahashi et al. | 60/321 |

FOREIGN PATENT DOCUMENTS

| | | |
|---|---|---|
| DE | 831035 | 2/1952 |
| DE | 3635478 | 2/1988 |
| DE | 42 06 247 | 6/1993 |
| DE | 295 18 189 | 1/1996 |

* cited by examiner

Primary Examiner—Thomas Denion
Assistant Examiner—Tu M. Nguyen
(74) Attorney, Agent, or Firm—Charles L. Schwab; Nexsen Pruet Jacobs & Pollard, LLC

(57) ABSTRACT

The invention concerns an exhaust gas duct with an exhaust gas guide channel (13) which is placed, leaving an air-filled space (18), in a sheath wherein circulates a cooling liquid and enclosing at least partially said exhaust gas guide channel (13). The invention is characterised in that said sheath is divided along the row of cylinders and has a base body (10b) wherein the exhaust gas guide channel (13) can be inserted, and a cover (3) closing said base body, thereby obtaining a modular structure for transporting exhaust gas which enables continuous control, in particular, control over the exhaust gas guide channel.

3 Claims, 2 Drawing Sheets

EXHAUST GAS DUCT COOLED WITH WATER

TECHNICAL FIELD

This invention relates to an exhaust line for a cylinder bank of an internal combustion engine, an exhaust conveying duct being enclosed, beyond an air gap, by a housing at least partly surrounding the exhaust conveying duct, through which housing there is a flow of coolant.

BACKGROUND ART

Such an exhaust line is shown in German patent documents DE 42 06 247 issued Jun. 3, 1993 on an exhaust gas line for a row of cylinders of an internal combustion engine. This exhaust line has an extrusion-molded part made of light metal into which there are recessed several longitudinal chambers, mutually connected at least in the closure covers, for cooling water. This extrusion-molded part is approximately round in shape and has openings that are arranged in the region of the individual exhaust ports of the respective cylinder heads. Inserted into the extrusion-molded part is a one-piece gas conveying duct, which must be connected to the previously mentioned openings in gas-tight fashion, in a manner not described. Precise making of a connection is very costly. Inspection of the gas conveying duct after assembly is scarcely possible.

It is an object of the invention to furnish an exhaust line of easily maintainable construction for a cylinder bank of an internal combustion engine.

OBJECTS AND SUMMARY OF THE INVENTION

This object is achieved by virtue of the fact that the housing is split along the cylinder bank and has a housing base, into which the exhaust conveying duct is insertable, and a housing cover covering the housing base. A modular exhaust line construction is thereby created, which permits, for example, inspection of, in particular, the exhaust conveying duct at any time, without great effort, by removing the housing cover. In this way the air gap can be inspected over the entire length of the removed housing cover and examined, for example, for leaks of any kind that may be present.

In development of the invention, the housing base is divided into housing base segments, preferably U-shaped and enclosing a certain number of cylinders. These can be, for example, two cylinders each, so that identical housing base segments can be mounted for various internal combustion engines if, for example, the internal combustion engine is made as an eight- or 16-cylinder internal combustion engine of V design. Naturally, it is also contemplated in the context of the invention to provide additional housing base segments for, for example, three cylinders, so that other cylinder numbers are also feasible. In addition to these housing base segments, which are assigned to the individual cylinders, there are also various housing base end segments, which can be made, for example, as covers and/or connecting devices for a (liquid-cooled) turbocharger, with the incorporation of wastegate ducts if appropriate.

In corresponding development of the invention, the housing cover is likewise divided into housing cover segments enclosing a number of cylinders. What was said about the housing base segments applies as appropriate to these housing cover segments.

In development of the invention, the housing base segments are attachable to the cylinder heads and have openings in the region of the exhaust port of each cylinder head. In further development, the exhaust conveying duct is attachable to the individual cylinder heads in gas-tight fashion with flange regions extending into the openings. Thus, according to this design, the housing base segments are first mounted and then the exhaust conveying duct is inserted into these U-shaped housing base segments. Finally, the housing cover segments are then mounted. In particular, moreover, individual mounting or in particular removal, for example for the repairing of a cylinder, can take place by virtue of the fact that, in development of the invention, the exhaust conveying duct is formed by separate pipe segments assigned to each cylinder. Naturally, it is a prerequisite here that the cylinders or in particular the cylinder heads be removable individually or in correspondence to the segments of the housing base segments.

In development of the invention, the housing base segments have through coolant conveying ducts in the region of the two parallel arms of the U-shaped housing. Coolant, in particular cooling water, flows through these coolant conveying ducts in common. The coolant flows in one direction along the cylinder bank in both coolant conveying ducts. Accordingly, the housing base end segments are designed so that external or internal coolant ports are connectable to them and these coolant ports distribute the coolant into the coolant conveying ducts. These coolant conveying ducts are included in the coolant conveyance from the internal combustion engine discharge via the turbo charger to a plate head exchanger.

In further development of the invention, a coolant duct is also recessed in the housing cover. This coolant duct connects, along one cylinder bank A, a thermostat housing to an intercooler and, along the other cylinder bank B, the intercooler to the plate heat exchanger. These connections were formerly effected via separate pipes to be attached externally to the internal combustion engine. Integration of these lines into the housing cover results in, on the one hand, additional cooling of the exhaust pipe and, on the other, the saving of the formerly required pipes. Naturally, the corresponding ports, pipe clamps and hose connections are likewise saved.

BRIEF DESCRIPTION OF THE DRAWINGS

Further advantageous developments of the invention are presented in the description of the drawings, in which an exemplary embodiment of the invention, illustrated in the figures, is described in greater detail.

DETAILED DESCRIPTION OF THE INVENTION

Figure 1:
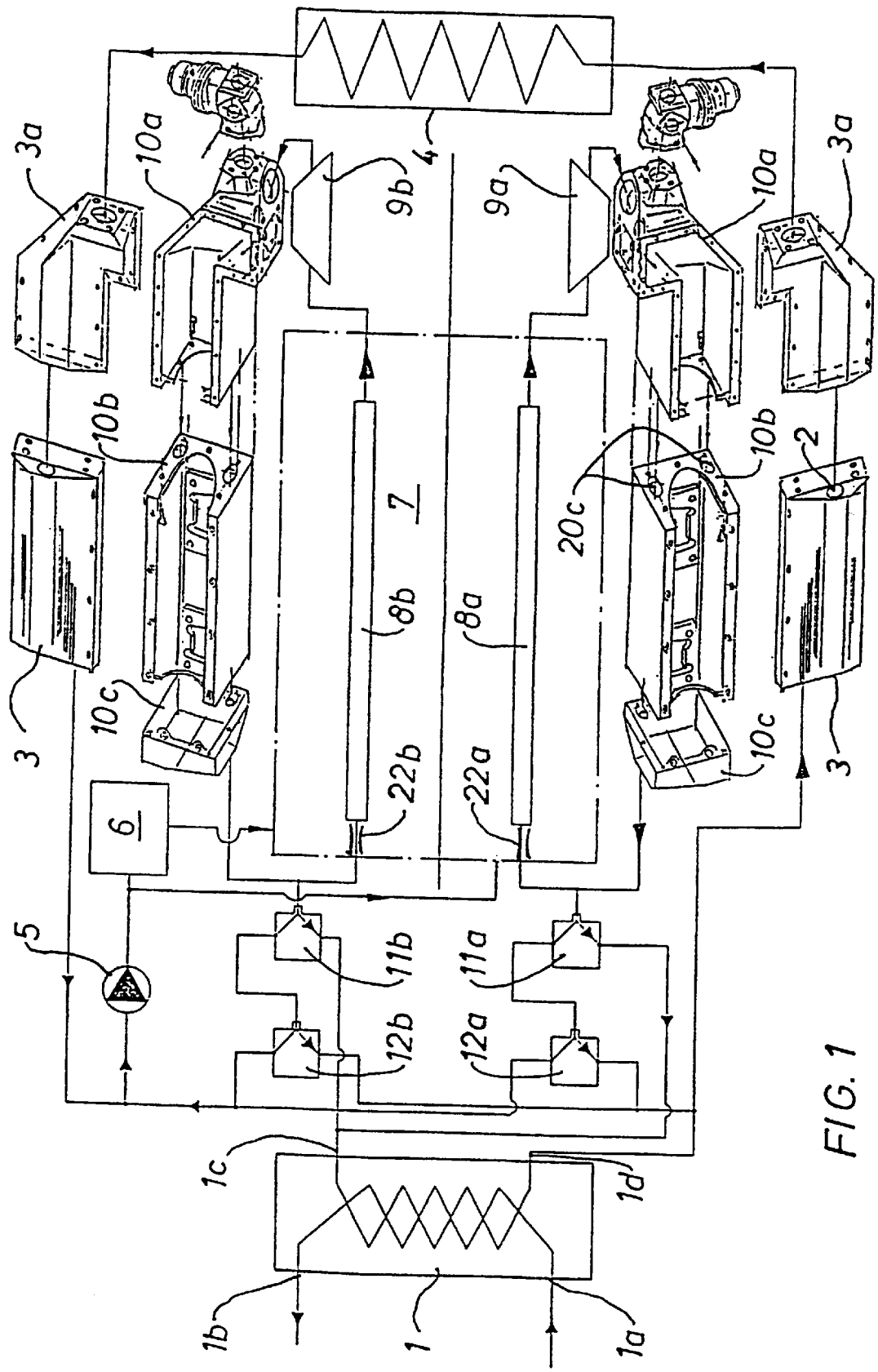
FIG. 1 shows an overall schematic diagram with the housing base and housing cover according to the invention.

The overall schematic diagram of FIG. 1 shows the coolant system of a multi-cylinder V-type diesel internal combustion engine, which can be used, for example, for ship propulsion. In this case, there is a plate heat exchanger 1, which raw water enters via an inlet 1a and again exits via a discharge 1b. Correspondingly, the coolant flows in countercurrent into the plate heat exchanger via an inlet 1c and out again via a discharge 1d. From the discharge 1d, the coolant is conveyed via a coolant duct 2 (FIG. 2) in housing cover segments 3, 3a of a cylinder bank to an intercooler 4. From intercooler 4, the coolant passes along the opposite cylinder bank of the internal combustion engine, back into a housing cover segment 3a, and then into a housing cover segment 3. From there the coolant is delivered to a coolant pump 5, which has a suction chamber and two pressure chambers. From one of the pressure chambers, the coolant is delivered via an oil cooler 6 into the coolant system (coolant header 8b) of internal combustion engine 7, while the second pressure chamber delivers the coolant directly into a further coolant system (coolant header 8a). After flowing through the internal combustion engine, the coolant passes from coolant headers 8a, 8b into respective turbochargers 9a, 9b, to pass from there via housing base segments 10a, 10b and housing base end segments 10c back on the opposite side of the internal combustion engine into thermostat housing 11a, 11b. A sidestream is also conveyed from coolant headers 8a, 8b, via diaphragms 22a, 22b, to thermostat housings 11a, 11b. According to the setting of high-temperature thermostats in thermostat housings 11a, 11b, the main stream is conveyed either to plate heat exchanger 1 or to low-temperature thermostats 12a, 12b. These low-temperature thermostats 12a, 12b convey the coolant either to coolant pump 5 or to the connection between discharge 1d and housing cover segment 3. Housing base segments 10a, 10b, 10c and housing cover segments 3, 3a are integrated into the single-circuit mixed cooling system and serve primarily as coolant lines replacing the former external pipes.

Figure 2:
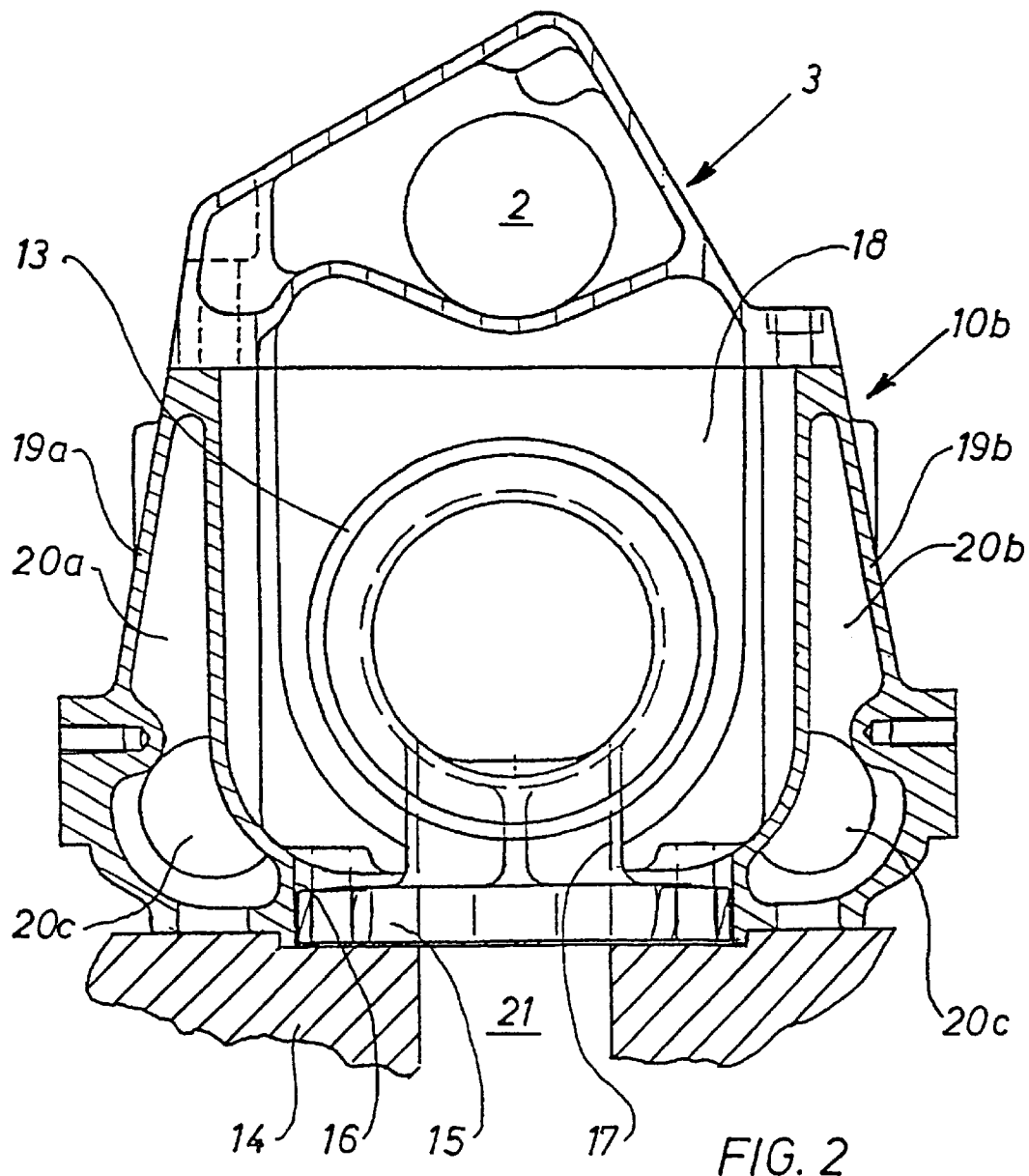
FIG. 2 shows a detail view of the housing base, the exhaust pipe and the housing cover.

FIG. 2 shows a detail view of the housing base, the exhaust pipe and the housing cover. The housing base is cut in the region of a housing base segment 10b, which in turn is covered by a housing cover segment 3. The exhaust conveying duct with individual pipe segments 13, each assigned to one cylinder, is inserted into housing base segment 10. Assembly is done by first bolting housing base segment 10b to a cylinder head 14, which is sketchily illustrated. Next, pipe segments 13 are inserted into these housing base segments 10b and likewise bolted to cylinder head 14, each with a flange region 15 that extends through a corresponding opening 16 in housing base segment 10b. Pipe stubs 17 make the gas-tight connection between the interior of pipe segments 13 and exhaust port 21 of each cylinder head 14. For the rest, these pipe segments 13 are designed as so-called pearl elements.

Pipe segments 13 are inserted in housing base segment 10b so as to form an air gap 18. Housing base segment 10b is U-shaped and has coolant conveying ducts 20a, 20b along the two parallel arms 19a, 19b of the U. In the region of the end regions of housing base segments 10b, coolant conveying ducts 20a, 20b narrow to approximately circular coolant conveying duct passages 20c.

A coolant duct 2 is recessed into housing cover segment 3, filling the whole interior along housing cover segment 3 and being constricted to an approximately circular opening only in the region of the opposite end pieces. Housing cover segment 3 is attached to housing base segment 10b with bolts.

What is claimed is:

1. An exhaust line for a cylinder bank of an internal combustion engine having a cylinder head (14) covering each cylinder of the cylinder bank and presenting an exhaust port (21) for each cylinder, said exhaust line comprising:
    a housing including
        a first U-shaped housing segment (10b) having opposite ends, a base secured to said cylinder head (14) and a pair of spaced arms (19a, 19b) extending from said base, said base having openings (16) aligned with said exhaust ports (21);
        a second U-shaped housing segment (10a) secured in aligned relation to one of said ends of said first U-shaped housing segment (10b);
        a housing end segment (10c) secured to the other of said ends of said first U-shaped housing segment (10b);
        a housing cover including a first cover segment (3) releasably secured to said first U-shaped housing segment (10c) and a second cover segment (3a) releasably secured to said second U-shaped housing segment (10a),
        coolant conveying ducts (20a, 20b) in said arms (19a, 19b) of said first U-shaped housing segment (10b);
    an internal cooling duct (2) in said housing cover and
    an exhaust conveying duct positioned within said housing to provide an air gap between said exhaust conveying duct and said housing, said exhaust conveying duct including flange regions (15) which extend through said openings (16), respectively, and are secured directly to the associated cylinder head (14) independent of said U-shaped housing segments to form a gas tight connection of said flange regions (15) with said exhaust ports (21).

2. The exhaust line of claim 1 including fluid flow connections permitting coolant flow through said internal coolant duct (2) in said housing cover (3, 3a) independently of said coolant conveying ducts (20a, 20b).

3. The exhaust line of claim 1 wherein coolant passing through said ducts (20a, 20b) in said arms (19a, 19b) of said U-shaped housing segment also passes through the associated liquid cooled turbo charger.

* * * * *